United States Patent
Weiss

(10) Patent No.: US 9,320,293 B2
(45) Date of Patent: Apr. 26, 2016

(54) POPCORN KETTLE

(75) Inventor: Ronald R. Weiss, Okeana, OH (US)

(73) Assignee: Gold Medal Products Company, Cincinnati, OH (US)

( * ) Notice: Subject to any disclaimer, the term of this patent is extended or adjusted under 35 U.S.C. 154(b) by 1253 days.

(21) Appl. No.: 12/134,515

(22) Filed: Jun. 6, 2008

(65) Prior Publication Data

US 2009/0304876 A1 Dec. 10, 2009

(51) Int. Cl.
*A23L 1/00* (2006.01)
*A23L 1/18* (2006.01)

(52) U.S. Cl.
CPC .................................. *A23L 1/1815* (2013.01)

(58) Field of Classification Search
USPC ........ 99/323.5, 348; 366/252, 326.1; D7/325; 219/429, 385; 126/39 E
See application file for complete search history.

(56) References Cited

U.S. PATENT DOCUMENTS

| | | | | |
|---|---|---|---|---|
| 1,508,452 A | * | 9/1924 | Harrington | 219/618 |
| 1,705,702 A | * | 3/1929 | Backer | 219/468.1 |
| 1,715,692 A | * | 6/1929 | Backer | 219/468.1 |
| 1,813,767 A | * | 7/1931 | Reichart | 219/536 |
| 1,826,948 A | * | 10/1931 | Nelson | 366/248 |
| 2,070,498 A | * | 2/1937 | Tournier | 219/453.14 |
| 2,120,718 A | * | 6/1938 | Smith | 366/248 |
| 2,189,127 A | * | 2/1940 | Brannon | 219/438 |
| 2,207,876 A | * | 7/1940 | Sandell | H05B 3/70 219/458.1 |
| 2,427,945 A | * | 9/1947 | Clark et al. | 219/516 |
| 2,505,967 A | * | 5/1950 | Humphrey | 366/248 |
| 2,695,947 A | * | 11/1954 | Heerdt | 219/417 |
| 2,712,055 A | * | 6/1955 | Campbell | 219/486 |
| 3,010,006 A | * | 11/1961 | Schwaneke | 219/442 |
| 3,031,735 A | * | 5/1962 | Jepson | 29/611 |
| 3,064,112 A | * | 11/1962 | Hanzel | 219/436 |
| 3,082,313 A | * | 3/1963 | Jepson et al. | 219/441 |
| 3,095,498 A | * | 6/1963 | Foster | 219/441 |
| 3,384,195 A | * | 5/1968 | Jepson et al. | 219/442 |
| 3,487,200 A | * | 12/1969 | Vello et al. | 219/437 |
| 3,593,652 A | * | 7/1971 | Lostanlen | 99/423 |
| 3,715,567 A | * | 2/1973 | Mandziak | 219/437 |
| 3,722,399 A | * | 3/1973 | Cole | 99/323.8 |
| 3,739,148 A | * | 6/1973 | Ryckman, Jr. | 219/441 |
| 3,798,415 A | * | 3/1974 | Graham | 219/441 |
| 3,934,118 A | * | 1/1976 | Jorgenson et al. | 219/442 |
| 4,115,918 A | * | 9/1978 | Anderl et al. | 29/611 |
| 4,149,455 A | * | 4/1979 | Ross | 99/323.5 |
| 4,243,874 A | * | 1/1981 | Fischer | 219/448.11 |
| 4,268,741 A | * | 5/1981 | O'Brien | H05B 3/68 219/430 |
| 4,270,067 A | * | 5/1981 | Thomas et al. | 219/438 |
| 4,286,377 A | * | 9/1981 | Hurko et al. | 29/612 |
| 4,307,287 A | * | 12/1981 | Weiss | 219/442 |
| 4,310,748 A | * | 1/1982 | Paulin | 219/437 |
| 4,350,875 A | * | 9/1982 | McWilliams | 219/448.19 |
| 4,388,520 A | * | 6/1983 | McWilliams | 219/445.1 |
| 4,458,139 A | * | 7/1984 | McClean | 219/433 |
| 4,492,853 A | * | 1/1985 | Lam | 219/432 |

(Continued)

*Primary Examiner* — Dana Ross
*Assistant Examiner* — Renee L Miller
(74) *Attorney, Agent, or Firm* — Wood, Herron & Evans, LLP

(57) ABSTRACT

A popcorn kettle is provided with a heater plate mounting one or more heater elements in an annular configuration about a thermostat. Two semicircular disposed slots in said heater plate isolate the thermostat from heat directly conducted through the plate to the thermostat except in defined areas between ends of the slots. This prevents a high rate of heat rise which could be witnessed by the thermostat causing premature cessation of a popping cycle.

10 Claims, 1 Drawing Sheet

(56) References Cited

U.S. PATENT DOCUMENTS

| | | | |
|---|---|---|---|
| 4,611,112 A * | 9/1986 | Schreder | 219/448.11 |
| 4,649,263 A * | 3/1987 | Goodlaxson | 219/438 |
| 4,735,135 A * | 4/1988 | Walker | 99/424 |
| 4,763,568 A * | 8/1988 | Kiczek | 99/323.5 |
| 4,855,572 A * | 8/1989 | Wallgren et al. | 219/444.1 |
| 5,363,748 A * | 11/1994 | Boehm et al. | 99/372 |
| 5,396,047 A * | 3/1995 | Schilling et al. | 219/448.11 |
| 5,522,308 A * | 6/1996 | Kayashima et al. | 99/331 |
| 5,643,485 A * | 7/1997 | Potter et al. | 219/621 |
| 5,841,108 A * | 11/1998 | Lacombe | 219/441 |
| 6,040,562 A * | 3/2000 | Tokumoto et al. | 219/530 |
| 6,486,446 B1 * | 11/2002 | Kao | 219/438 |
| 6,555,793 B2 * | 4/2003 | Griffiths et al. | 219/446.1 |
| 7,208,703 B2 * | 4/2007 | Shimatani et al. | 219/443.1 |
| 7,573,003 B2 * | 8/2009 | Gratz et al. | 219/448.17 |
| 2001/0003335 A1 * | 6/2001 | Griffiths et al. | 219/446.1 |
| 2001/0050005 A1 * | 12/2001 | Wang | 99/422 |
| 2004/0178187 A1 * | 9/2004 | McWilliams | 219/448.17 |
| 2005/0172829 A1 * | 8/2005 | Shimatani et al. | 99/403 |
| 2005/0274710 A1 * | 12/2005 | Toyos et al. | 219/448.11 |
| 2006/0219709 A1 * | 10/2006 | Kagan | 219/661 |
| 2007/0056448 A1 * | 3/2007 | Kernan | 99/323.5 |
| 2007/0084853 A1 * | 4/2007 | Shingler | 219/452.11 |
| 2014/0076174 A1 * | 3/2014 | Vernaglia et al. | 99/324 |

* cited by examiner

POPCORN KETTLE

This invention relates to popcorn popping and more particularly to an improved kettle for popping corn.

BACKGROUND OF THE INVENTION

Traditional popcorn popping kettles are provided with electrical heaters for heating unpopped kernels and popping them. The parameters of transfer of heat from the heaters to the kernels through the kettle are significant to the volume and taste of properly popped popcorn.

Previously, heaters have been brazed to the outside surface of a kettle bottom for enhancing conductivity of heat. Heat sensors such as thermostats or other heat sensors are also disposed on the kettle bottom. Once a popping cycle is initiated with energization of the heaters, the heat is conducted to the sensors. The popping control is arranged such that upon a sensed level of heat observed by the sensors, the heat cycle is interrupted so the popped batch can be dumped and new unpopped corn and oil added for another popping cycle.

This prior structure and process is subject to several inherent disadvantages.

For example, the power or wattage density can be so high that the heat from the heater is quickly conducted to the thermostats. They too quickly reach their cycle limit before the kettle surfaces are all appropriately heated for most efficient popping. Thus, high heat limits as sensed by these or other sensors are reached before the actual popping cycle is complete. Early termination of heating results in poor popping of the batch of corn.

For appropriate high quality results, popcorn requires a certain amount of heat for popping. If the sensed temperatures are reached before the sufficient heat has been transferred to the popcorn through the properly heated kettle, the result is incomplete or poor popping, smaller volumes and generally poor results.

Complicating the process is the delay observed, in the first few popping cycles, of the kettle in reaching an "equilibrium" of heat throughout. While a temperature level is set to indicate cycle completion for a kettle having reached equilibrium, that same sensed temperature level observed prior to a kettle reaching an equilibrium may not indicate that sufficient heat has been imparted to the load of popcorn for efficient popping.

This occurs, for example, when a kettle is first turned on, as with a first batch. Heat may be more quickly conducted to the heat sensors at a rate quicker than the time required for the kettle to reach an equilibrium. Since the heated kettle at equilibrium more efficiently transfers heat for popping, the sensing of a temperature level for a kettle upon a first or cold start may not be optimum for indicating the end of an efficient popping cycle for the first or first several cycles.

Accordingly, it has been one objective to provide an improved popping kettle in which the sensed heat level for the first cycle of popped corn is an accurate indication of efficient cycle completion.

Another objective of the invention has been to provide an improved popping kettle where sensed heat by a heat sensor in a first cycle does not prematurely indicate completion of popping for the first cycle.

Another objective of the invention has been to provide an improved popping kettle with improved heater and heat sensor mounting structure.

To these ends, a preferred embodiment of the invention comprises a popcorn kettle with a heater plate secured to a kettle bottom with heaters and thermostats mounted on the plate. A pattern of semicircular slots is provided in the plate, such that slots are oriented in the plate between the heaters and the thermostats. Ends of the slots define therebetween heat conduction paths between the heaters and thermostat, but the paths or conduction areas represent only limited conduction areas as compared to a plate without any slots or discontinuities between the heaters and the thermostat. These slots are sufficient to diminish the initial conduction of heat to the thermostats and thus reduce the rate of initial thermal saturation of the thermostats to a degree sufficient to allow even the first batch of corn to finish popping.

Heat conductivity to the thermostats is thus delayed sufficiently so the thermostats do not prematurely reach their set levels to indicate completion of a popping cycle before sufficient heat has been transferred to the load of corn for efficient popping.

This structure allows the kettle to reach more of an "equilibrium" of heat during even the first batch of popping so that too quick conduction of heat to the thermostats does not prematurely end a popping cycle.

Thus, the invention contemplates an improved popcorn popping kettle wherein heaters are mounted to the kettle via a heat plate provided with predetermined structurally restricted heat conduction pathways between the heaters and heat sensing thermostats to prevent premature cessation of popping due to rate of heat rise and the thermostat.

These and other objects and advantages will be readily appreciated from the following written description and from the drawings in which:

DETAILED DESCRIPTION OF A PREFERRED EMBODIMENT

Figure 1:
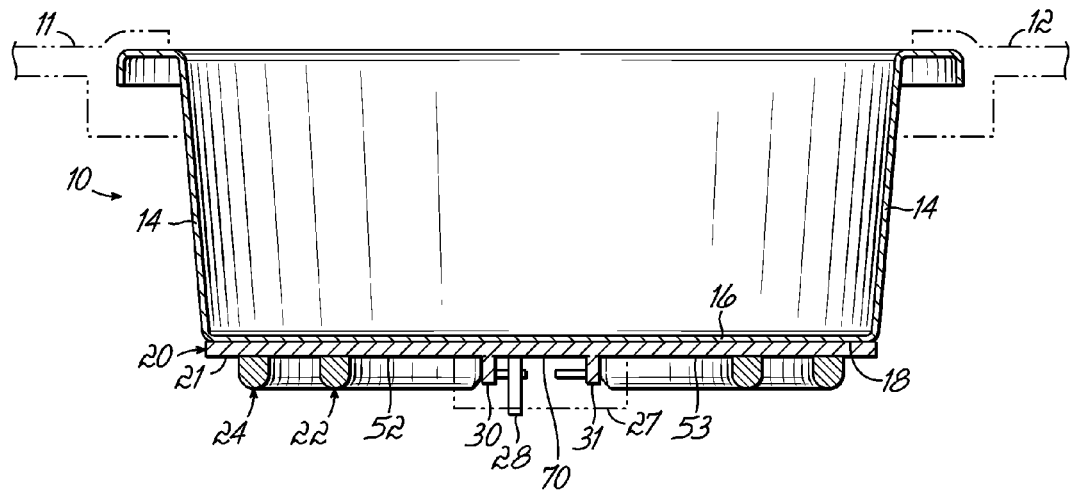
FIG. 1 is an elevational view in cross-section illustrating a popcorn kettle according to the invention.

Turning now to the drawings, FIG. 1 illustrates a popcorn popping kettle 10 according to the invention. While not a part of this invention, it will be appreciated that the kettle can be supported by any suitable kettle supports 11, 12 (phantom lines) for popping and preferably for dumping the kettle as is well known in the art. Kettle 10 may also be supplied with appropriate tops, corn agitators or other accessories not particularly significant to this invention and thus not shown. In other words, the invention herein is readily adaptable to a plurality and variety of popcorn popping kettles.

Kettle 10 includes sidewall 14 and a bottom wall 16 having an outside surface 18. Preferably, the kettle is made of stainless steel but any suitable kettle material will suffice. The kettle interior and rim is preferably polished.

A heater plate 20 is mounted on the outside surface 18 of the kettle bottom wall 16. To this plate 20 are mounted one or more heaters 22, 24 and one or more heat sensors such a thermostat 26 (shown only diagrammatically in FIG. 2) covered by a housing graphically illustrated at 27. Tall posts 28, 29 and short posts 30, 31 are provided for thermostat mounting and ground connection. While any suitable thermostat can be used, one such thermostat is that sold under model number SA-59 by Towex Norstat, Ltd., 8$^{th}$ Floor, Hung To Road, Kwun Tong, Kowloon, Hong Kong.

Heaters 22, 24 are preferably electrically energized element heaters formed in the generally annular orientation as shown in the drawings and mounted to plate 20 by brazing or by any other suitable method. Inner heater 22 has respective ends 34, 35, while outer heater 24 has respective ends 37, 38 for respective electrical connections to terminals 39-42 as shown, so the elements 22, 24 can be heated upon application of electrical power thereto.

Heaters 22, 24 may be of any suitable rating, however, wattage ranges of 1240 watts to 1500 watts are suitable.

Two semicircular slots 44, 46 are defined in plate 20, oriented end-to-end as shown, and preferably extending through the plate. Thus, slot 44 has respective ends 48, 49 and slot 46 has respective ends 50, 51. Slots 44, 46 are relieved through plate 20 so the generally planar surface 21 is broken or interrupted by slots 44, 46 as shown.

While plate 20 can be of any suitable material and thickness, it is preferably of aluminum and is about 0.125″ thick. In one embodiment, the plate is about 9 to 9.5 inches in diameter (similar to that of the kettle bottom) but, of course, it may be sized appropriately to fit the respective kettle with which it is used.

In such a preferred plate, the slots are at about 2.25 inches in radius from the center of plate 20, with the heaters sequentially oriented outside the slots toward the periphery of plate 20.

Preferably, the slots are about 0.188 inch in width, extending entirely through plate 20. Also, respective slot ends 48, 50 are about 0.6 inches apart on one hand and ends 49, 51 on the other are preferably about one inch apart. Thus, the surface 21 of plate 20 is generally planar and unbroken through areas 52, 53. As noted, area 52 is about 0.6 inches in width between slot ends 48, 50 and area 53 about one inch in width between slot ends 49, 51. Thus, the respective ends of the respective slots define conduction paths or areas 52, 53 therebetween.

Figure 2:
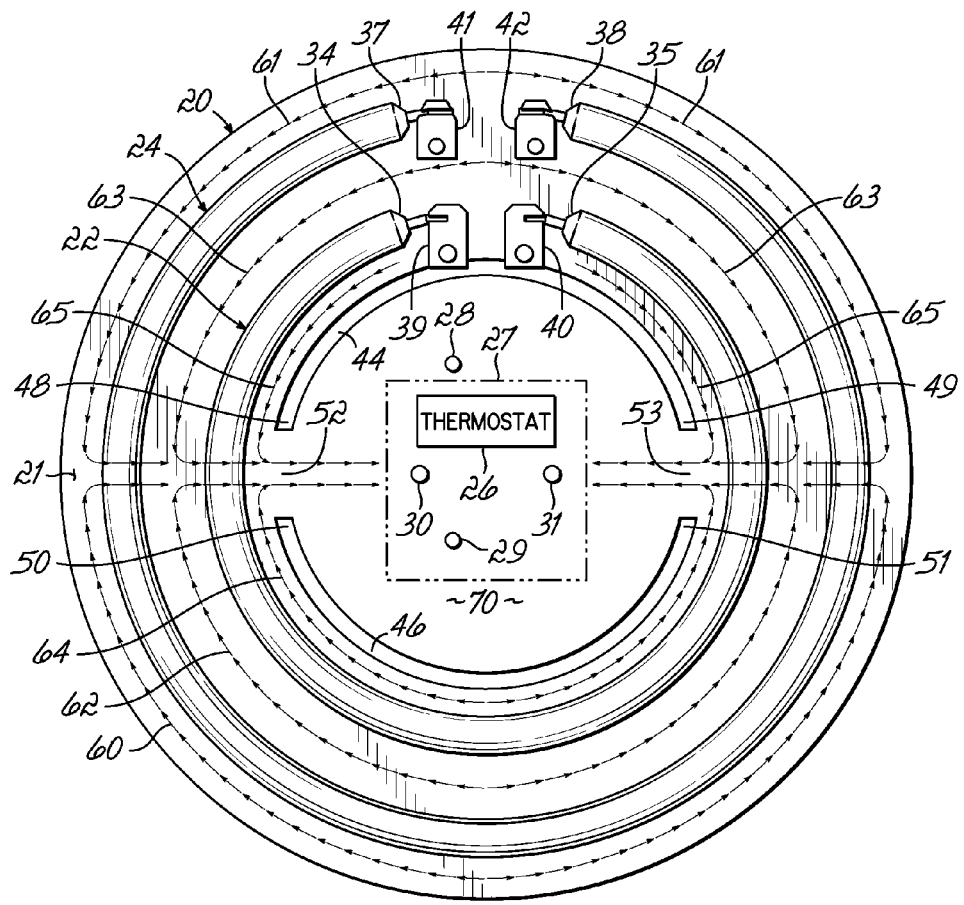
FIG. 2 is a bottom view of the heater plate applied to the kettle of FIG. 1.

Heat conduction in plate 20 is illustrated by the arrowed lines in FIG. 2. For example, heat is conducted in plate 20 along conduction lines 60, 61 in the opposite directions indicated by the arrows in lines 60, 61. Heat is conducted around conduction lines 62, 63 in opposite directions illustrated by the line arrows. The same is true of respective conduction lines 64, 65 as illustrated.

It will be appreciated that plate 20 defines a central portion 70 almost but not wholly or completely surrounded by slots 44, 46 and excepting conduction areas 52, 53. Accordingly, slots 44, 46 effectively block conduction of heat from heaters 22, 24 through plate 20, to central portion 70, and excepting what heat is conducted to center portion 70 through unbroken or uninterrupted areas or paths 52, 53 in plate 20.

As a result, heat conduction to central portion 70 where thermostat 26 is mounted is reduced essentially only to that heat conducted through conduction areas 52, 53. Even when heaters 22, 24 are fully energized, as when commencing a fresh or first popping cycle, only such heat as conducted through areas 52, 53 quickly reaches thermostat 26. The heat level sensed by thermostat 26 is thus significantly less, than if conduction of heat from heaters 22, 24 through plate 20 was not interrupted by slots 44, 46.

Heat rise at thermostat 26 is thus slower than in portions of plate 20 having uninterrupted surface areas to heaters 22, 24. The heater plate 20 and kettle 10 is thus heated more evenly and throughout a longer cycle to a temperature than would otherwise be reached if thermostat 26 was not so thermally isolated from heaters 22, 24.

The first corn load in kettle 10 is thus more completely and efficiently popped and that first cycle is not prematurely terminated by an artifact or false temperature level sensed by thermostat 26.

As popping continues, the kettle and plate 20 reach an equilibrium. The set or high limit temperature sensed by thermostat 26 is thus a more accurate control parameter for managing further cycle duration and is more readily consistent for all batches. The power of the heaters does not initially overwhelm the thermostat due to their spatial proximity or otherwise full and uninterrupted conduction path to the thermostat.

It will be appreciated that the thickness of plate 20 and the width of areas 52, 53 can be adjusted to affect the rate of temperature rise at thermostat 26. Such structural adjustments can be made to appropriately adjust this rate for a variety of differing kettle and heater plate sizes and parameters. The structure of the plate and slots can be determined to provide the proper rate of heat rise sensed by the thermostat for the heater wattage and kettle size in use.

These and other advantages and modifications will become readily apparent from the foregoing without departing from the scope of the invention and applicant intends to be bound only by the claims appended hereto.

What is claimed is:

1. A popcorn popping kettle having kettle side walls and a bottom wall and comprising:
   a heat conducting heat plate mounted in direct engagement with said bottom wall of said kettle;
   at least one heater operably mounted to and directly engaging said plate for conducting heat there-through to said kettle bottom wall;
   a thermostat mounted on said heater plate;
   at least two slots extending entirely through said heater plate and oriented at least partially between said at least one heater and said thermostat, said at least two slots at least partially blocking conduction of heat in said heat conducting heat plate between said at least one heater and said thermostat;
   wherein said at least two slots each have two ends, one end of each said slot disposed adjacent a respective end of another said slot and defining between said adjacent ends heat conduction areas in said heat conducting heat plate directly between said heater and said thermostat.

2. A kettle as in claim 1 further including two heaters on said heat conducting heat plate, said slots disposed directly between portions of said heaters and said thermostat, and radially interiorly of said two heaters.

3. A kettle as in claim 1 wherein said heat conduction areas are disposed in said heater plate on opposite sides of said thermostat.

4. A kettle as in claim 1 wherein said two heaters substantially but not fully surround said thermostat.

5. A kettle as in claim 4 wherein said heat conduction areas defined in said heater plate by ends of said two slots are disposed between portions of said heaters and said thermostat.

6. A popcorn popping kettle having a bottom wall and comprising:
   a heat conductive heater plate mounted on said bottom wall of said kettle and in engagement therewith;
   at least one heater and one temperature sensor both mounted on and directly engaging said heat conductive heater plate;
   an opening in said heat conductive heater plate between said heater and said sensor, said opening having ends, said opening oriented in said heat conductive heater plate and blocking direct heat conduction in at least one area of said heat conductive heater plate directly between said heater and said sensor,
   said opening ends defining a heat conduction area therebetween said ends in said heat conductive heater plate disposed radially interiorly of said at least one heater and directly between said at least one heater and said sensor between said ends of said opening.

7. A method of popping popcorn in a kettle having a bottom wall and a heat conducting heater plate attached to and in engagement with said bottom wall of the kettle, said heat conducting heater plate having a heater and a temperature sensor both mounted on and directly engaging said heat conducting heater plate, said method comprising the steps of:
   applying heat to said heat conducting heater plate and from said heat conducting heater plate to said kettle by heat conduction from said heater;
   conducting heat through said heat conducting heater plate directly to said temperature sensor through a heat conduction path in said heat conducting heater plate; and
   blocking direct conduction of heat directly through said heat conducting heater plate to said temperature sensor outside a portion of said path by obstructing direct heat conduction from said heater in a radial direction from a portion of said heater to said temperature sensor.

8. In combination, a popcorn popping kettle and heater apparatus for heating the kettle to pop popcorn therein, said kettle having a kettle bottom and sidewalls for containing popcorn and said heater apparatus comprising:
   a heat conducting heater plate;
   said heat conducting heater plate mounted on and directly engaging said kettle bottom for heating said kettle bottom and kettle sides through direct heat conduction from said heat conducting heater plate to said kettle bottom;
   a heat responsive thermostat mounted on and directly engaging said heat conducting heater plate;
   a heat generating element mounted on and directly engaging said heat conducting heater plate;
   said heat conducting heater plate defining a direct heat conduction pathway therein from said heat generating element to said thermostat;
   at least one elongated slot within said heater plate disposed radially between said heat generating element and said thermostat, said slot being disposed in said heat conducting heater plate in areas outside said heat conduction pathway, said slot blocking direct conduction of heat from said heat generating element to said thermostat along said slot spaced from said pathway.

9. In the method according to claim 7,
   said method including blocking direct heat conduction with at least one slot in a portion of said heater plate, outside said path and in a radial direction between a portion of said heater and said temperature sensor, wherein said heater portion is radially spaced outwardly beyond said blocking at least one slot.

10. A method as in claim 9, wherein said temperature sensor has a rate of thermal saturation where heat is conducted in said heater plate from said heater to said temperature sensor and wherein said blocking step includes reducing a rate of initial thermal saturation of said temperature sensor from said heater.

* * * * *